United States Patent [19]
Hays

[11] Patent Number: 5,685,691
[45] Date of Patent: Nov. 11, 1997

[54] MOVABLE INLET GAS BARRIER FOR A FREE SURFACE LIQUID SCOOP

[75] Inventor: Lance G. Hays, La Crescenta, Calif.

[73] Assignee: Biphase Energy Company, Placentia, Calif.

[21] Appl. No.: 675,277

[22] Filed: Jul. 1, 1996

[51] Int. Cl.[6] .................................................. F04D 1/12
[52] U.S. Cl. .................................................. 415/88
[58] Field of Search .................................... 415/88, 80

[56] References Cited

U.S. PATENT DOCUMENTS

| | | |
|---|---|---|
| 2,531,896 | 11/1950 | Telbizoff . |
| 3,093,080 | 6/1963 | Tarifa et al. . |
| 3,358,451 | 12/1967 | Feldman et al. . |
| 3,749,513 | 7/1973 | Chute . |
| 3,838,668 | 10/1974 | Hays et al. . |
| 3,879,949 | 4/1975 | Hays et al. . |
| 3,936,214 | 2/1976 | Zupanick . |
| 3,972,195 | 8/1976 | Hays et al. . |
| 4,087,261 | 5/1978 | Hays . |
| 4,141,219 | 2/1979 | Elliot . |
| 4,227,373 | 10/1980 | Amend et al. . |
| 4,258,551 | 3/1981 | Ritzi . |
| 4,267,964 | 5/1981 | Williams . |
| 4,298,311 | 11/1981 | Ritzi . |
| 4,336,693 | 6/1982 | Hays et al. . |
| 4,339,923 | 7/1982 | Hays et al. . |
| 4,391,102 | 7/1983 | Studhalter et al. . |
| 4,441,322 | 4/1984 | Ritzi . |
| 4,511,309 | 4/1985 | Maddox . |
| 5,385,446 | 1/1995 | Hays . |
| 5,525,034 | 6/1996 | Hays . |

FOREIGN PATENT DOCUMENTS

| | | |
|---|---|---|
| 59-122702 | 7/1984 | Japan . |
| 64-80701 | 3/1989 | Japan . |

*Primary Examiner*—John T. Kwon
*Attorney, Agent, or Firm*—William W. Haefliger

[57] ABSTRACT

A rotary turbine apparatus which includes a separator having a rotating cylindrical wall receiving a stream of liquid and gas for separating gas from liquid, the liquid collecting in a rotating ring on the wall, and comprising a scoop having an inlet immersed in the rotating liquid ring to receive liquid from the ring; and barrier structure located proximate the scoop inlet to block gas entry to the scoop.

12 Claims, 3 Drawing Sheets

MOVABLE INLET GAS BARRIER FOR A FREE SURFACE LIQUID SCOOP

BACKGROUND OF THE INVENTION

This invention relates generally to the control of fluid ingestion into scoops; and more particularly, to separate a stream of gas from liquid, utilizing a scoop operating in conjunction with a rotary separator.

The rotary separator turbine is a device having a rotating cylindrical member, which causes separation of liquid from gas. The liquid is separated as a high velocity layer on the cylindrical wall. The preferred method to remove the liquid is an open scoop. However, variations in liquid layer flow rate can produce ingestion of gas by the scoop. The gas can cause noise and loss of efficiency in the process.

There is need for means to controllably block gas ingestion into the scoop; and further, there is need to block such gas ingestion irrespective of variations in the thickness of the rotating liquid layer on the rotating separator, or variations in the flow rate of the liquid relative to the scoop.

SUMMARY OF THE INVENTION

It is a major object of the invention to provide simple, effective apparatus and methods meeting the above needs. This object is met by providing in rotary turbine apparatus including a separator having a rotating cylindrical wall receiving a stream of liquid and gas for separating gas from liquid, the liquid collecting in a rotating ring on the wall, the combination comprising a) a scoop having an inlet immersed in the rotating liquid ring to receive liquid from the ring, b) and barrier structure located proximate the scoop inlet to block gas entry to the scoop.

As will be seen, the barrier structure typically includes a barrier surface past which liquid travels to enter the scoop. The barrier surface typically has a doctor tip or blade edge extent controlling the thickness of a portion of the liquid ring that enters the scoop. In this regard, the barrier surface may advantageously have taper in the direction of travel of the liquid that enters the scoop; and that barrier surface may be convex toward the oncoming liquid flow, as in a rotating liquid ring.

Another object includes means for effecting controllable displacement of the barrier structure toward the liquid ring. Such means typically includes a spring for urging the barrier structure toward the liquid ring.

Yet another object includes provision of a surface exposed to pressure exerted by impingement of liquid in the ring, that surface angled in such manner relative to the liquid ring as to create barrier position controlling force.

The turbine apparatus with which the invention is or may be associated typically has two two-phase nozzle means to receive a stream of mixed gas and liquid, as well as a rotating output shaft rotating in conjunction with the separator.

These and other objects and advantages of the invention, as well as the details of an illustrative embodiment, will be more fully understood from the following specification and drawings, in which:

DRAWING DESCRIPTION

DETAILED DESCRIPTION

Figure 1:
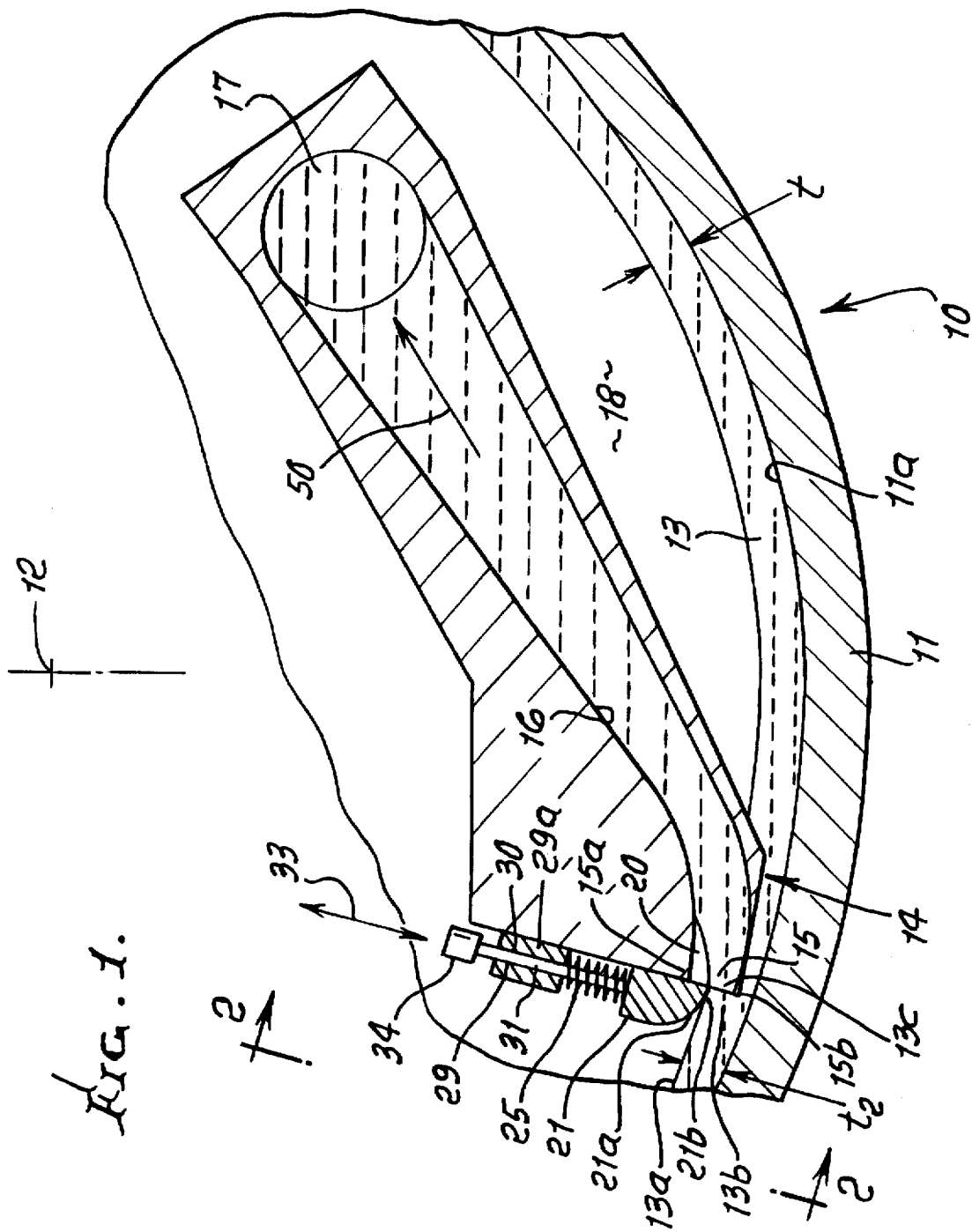
FIG. 1 is a fragmentary section showing details of one preferred form of the invention, and taken in a plane normal to the axis of separator rotation.
Figure 5:
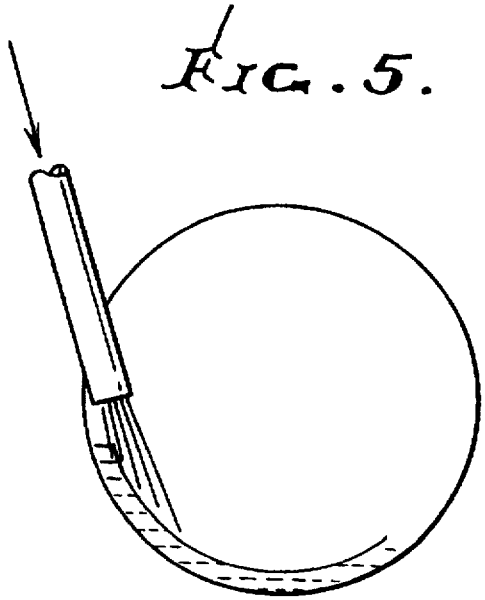
FIG. 5 is a schematic showing of a fluid nozzle jetting fluid into a rotary separator structure.

In FIG. 1, a rotary separator is shown at 10 and having an annular portion 11 with a surface 11a facing radially inwardly toward the separator axis 12 of rotation. A liquid film or layer builds up as a ring 13 on the rotating surface and is shown to have a thickness "t". Such liquid may typically be supplied in a jet, as from a two-phase nozzle. The nozzle, jet and separator elements are schematically shown in FIG. 5. See also U.S. Pat. No. 5,385,446, incorporated herein by reference, and wherein the momentum of the jet is transferred to the separator at its inner surface 11a, inducing rotation.

A scoop or diffuser structure is provided at 14 for removing liquid in the ring 13. The scoop has an entrance 15 defined by radially separated inner and outer lips 15a and 15b presented toward the relatively oncoming liquid in the ring. Lip 15b is immersed in the liquid ring; and lip 15a is located radially inwardly of the inner surface 13a of the liquid ring. Ring liquid at 13b, radially inwardly of the scoop lip 15b, enters the scoop at 13c, and flows via a passage 16 in the scoop toward outlet 17. See arrow 50. The scoop is normally non-rotating, i.e., fixed, or it may rotate, but at a slower rate than the separator.

Gas that has separated from the liquid that builds up as layer 13 collects in the separator interior, as at 18. Since lip 15a lies inwardly of the liquid ring inner surface 13a, there is a tendency for separated gas to enter the scoop at region 20, due to the drag effect of the rotating liquid ring upon the gas adjacent the liquid surface 13a.

Figure 2:
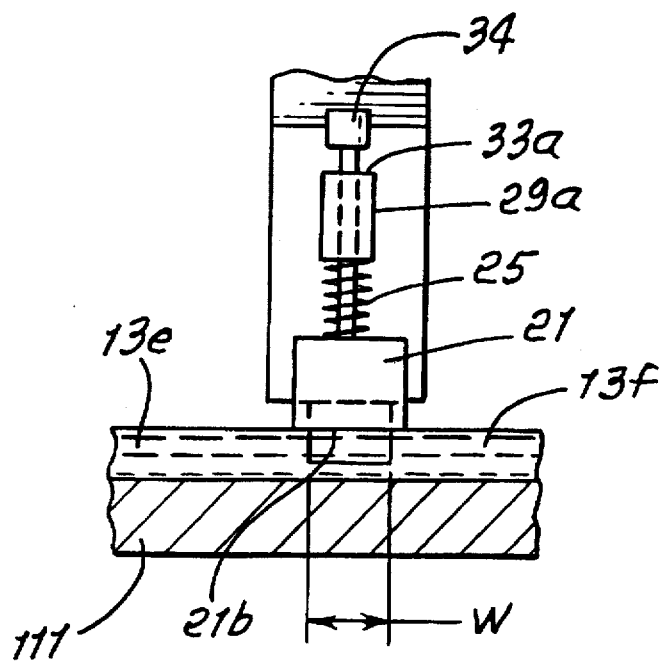
FIG. 2 is a fragmentary section taken on lines 2—2 of FIG. 1.

In accordance with the invention, barrier structure is provided, and located proximate the scoop entrance or inlet, to block gas exiting to the scoop. One such barrier structure is indicated at 21, and as having a barrier surface 21a projecting radially outwardly of the scoop inner lip 15b, i.e., toward the liquid ring, whereby liquid on the ring travels relatively past barrier surface 21a to enter the scoop at its inlet. The barrier surface has a doctor tip extent, indicated at 12b, controlling the radial thickness at $t_2$ of the liquid ring that enters the scoop. In this regard, $t_2$ is normally less than $t_2$. The doctor tip extent 21b is also normally of a width (parallel to axis 12) about the same as that of the scoop inlet. See FIG. 2.

The barrier surface is shown to have taper in the direction of relative travel of liquid that enters the scoop, and that taper is preferably convex, to minimize or prevent build up of liquid in a turbulent wake at the scoop entrance. Note in FIG. 2 that the scoop inlet width w is of lesser extent than the liquid in the ring, i.e., ring liquid exists at widthwise opposite sides of the scoop, as at 13e and 13f Accordingly, separated gas is prevented, or substantially prevented, from entering the scoop to flow to the outlet, and an efficient gas-liquid separation is achieved.

Another aspect of the invention concerns the provision of means for effecting controllable displacement of the barrier structure toward the liquid ring, whereby the thickness $t_2$ of the liquid layer entering the scoop is controlled. In the FIG. 1 and FIG. 2 example, such barrier displacement control means is shown in the form of a spring 25, positioned to urge the barrier structure toward the liquid ring. A balance is achieved between the force of the spring acting to urge the barrier toward the liquid ring, and the force of liquid impinging on the convex surface 21a of the barrier, to position the barrier radially as a function of separator rotary speed, liquid ring rotary speed, and liquid viscosity, whereby a controlled rate of liquid ingestion into the scoop to match liquid supply to the ring is achieved, and without air ingestion, i.e., the inlet is left open to liquid inflow, but is blocked for gas.

Guide structure is also provided for guiding such displacement of the barrier structure as it moves in direction toward and away from the liquid ring. See for example engaged relatively sliding surfaces 29 and 30 of the sleeve 29a and barrier stem 31, attached to the barrier and sliding in the bore in sleeve 29a attached to the scoop. A stop 34 on the stem is engageable with the end 33a of the sleeve to limit radially outward movement of the barrier structure, and its doctor tip, as referred to. See arrow 33.

Figure 3:
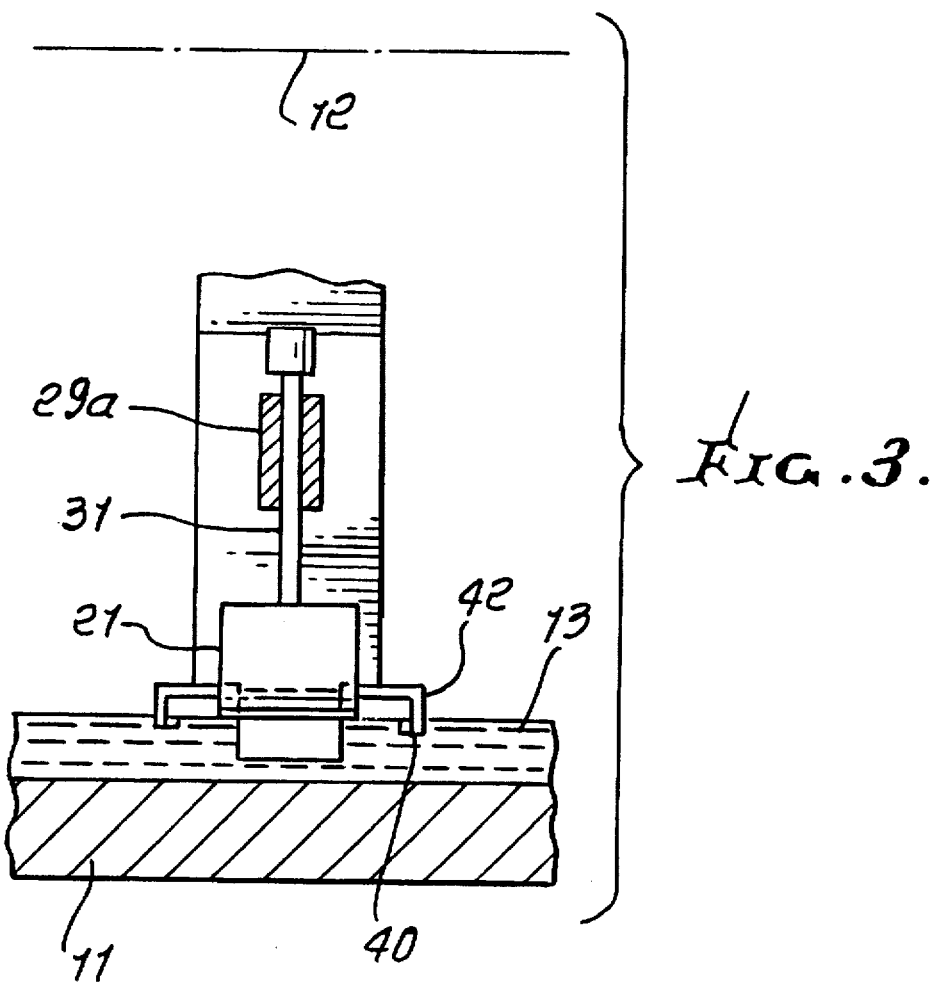
FIG. 3 is a view like FIG. 2 showing a modification.
Figure 4:
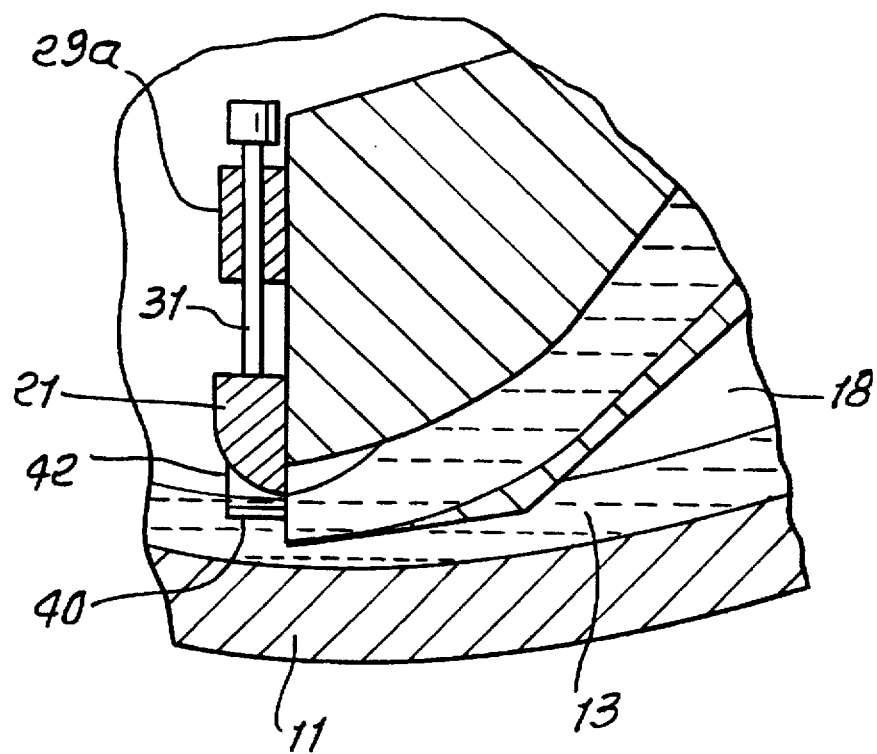
FIG. 4 is a view like FIG. 1 showing the FIG. 3 modification.

FIGS. 3 and 4 show use of a foil 40 or foils immersed in the liquid and angled relative to the direction of liquid ring travel, to receive liquid impingement acting to produce a force component in a radially outward (away from axis 12) direction. That foil is connected to the barrier structure 21, as via struts 42, to exert force on the barrier acting to move it into or toward the liquid. Such force is countered by the flow force exerted by ring 13 on the barrier convex surface, as referred to above, and a balance is achieved, as referred to. No spring is used in this example.

I claim:

1. In rotary turbine apparatus including a separator having a rotating cylindrical wall receiving a stream of liquid and gas for separating gas from liquid, the liquid collecting in a rotating ring on said wall, the combination comprising a) a scoop having an inlet immersed in said rotating liquid ring to receive liquid from the ring, b) and barrier structure located proximate said scoop inlet to block gas entry to the scoop, c) said barrier structure including a control surface past which liquid travels to enter the scoop, d) and means carrying the barrier structure for movement of said control surface toward and away from said inlet to control the scoop inlet area in response to changes in pressure exerted by liquid traveling past said barrier surface.

2. The combination of claim 1 wherein the barrier structure includes a barrier surface past with liquid travels to enter the scoop.

3. The combination of claim 1 wherein the barrier surface has doctor tip extent controlling the thickness of a portion of said liquid ring that enters the scoop.

4. The combination of claim 1 wherein said barrier surface has taper in the direction of travel of the liquid that enters the scoop.

5. The combination of claim 4 wherein said barrier surface taper is convex.

6. The combination of claim 4 wherein said convex surface receives pressure of liquid flowing to the scoop inlet, to urge the barrier in a direction away from the liquid flowing to the scoop inlet, and said means includes a spring for urging the barrier structure toward said liquid ring.

7. The combination of claim 1 including means for effecting controllable displacement of said barrier structure toward said liquid ring.

8. The combination of claim 7 including guide structure for guiding said displacement of the barrier structure in a direction to reduce the entrance area of said inlet.

9. The combination of claim 1 wherein said turbine apparatus has two-phase nozzle means to receive a stream of mixed gas and liquid.

10. The combination of claim 9 wherein the turbine apparatus has a rotating output shaft, rotating in conjunction with the separator.

11. In rotary turbine apparatus including a separator having a rotating cylindrical wall receiving a stream of liquid and gas for separating gas from liquid, the liquid collecting in a rotating ring on said wall, the combination comprising a) a scoop having an inlet immersed in said rotating liquid ring to receive liquid from the ring, b) and barrier structure located proximate said scoop inlet to block gas entry to the scoop, c) and including means for effecting controllable displacement of said barrier structure toward said liquid ring, d) said means including a spring for urging the barrier structure toward said liquid ring.

12. The combination of claim 11 wherein said means includes a surface exposed to pressure exerted by impingement of liquid in said ring.

* * * * *